April 5, 1938.  J. BATE  2,113,073
MANUFACTURE OF BEARINGS
Filed Nov. 18, 1936

Inventor:
John Bate,
By Potter, Pierce & Scheffler,
Attorneys

Patented Apr. 5, 1938

2,113,073

UNITED STATES PATENT OFFICE 2,113,073

MANUFACTURE OF BEARINGS

John Bate, Alperton, England, assignor to The Glacier Metal Company Limited, Alperton, England, a British company Application November 18, 1936, Serial No. 111,481
In Great Britain November 25, 1935

4 Claims. (Cl. 29—149.5)

This invention relates to the manufacture of bearings, and more particularly to one stage of a process wherein bearings are formed from blanks by any suitable means into circular or semi-circular form.

The invention is directed mainly, although not exclusively, towards the manufacture of blanks for bearings used in internal combustion motors, such, for example, as the gasoline and Diesel motors used in automobiles, aircraft and marine craft.

The only stage with which this invention is concerned is that of the production of a bi-metallic blank; the subsequent shaping of the blank, after it has been produced, does not form any part of the present invention.

By the term "bi-metallic blank" is meant a piece of material composed partly of backing metal as is commonly used for bearings, e. g. steel, brass, bronze, and alloys of these metals with each other or with metals not herein specified, and partly of bearing metal, e. g. white metal, Babbitt metal and other non-ferrous alloys suitable for a working surface. The term "blank" or "bearing blank" shall herein be construed to mean a piece of material which has been formed to a predetermined size and coated with bearing metal, prior to its subsequent shaping into circular or semi-circular form.

Likewise, the term "shearing" and "part-shearing" shall be herein construed to refer to any process or operation resulting in a partial or complete fracture or cleavage of the metal, irrespective of whether or not a true shearing action is performed.

In the manufacture of bi-metallic articles it has already been proposed to place one of the metal bodies,—e. g. the backing member,—in a mold, in such a manner as to expose the surface to which the other metal—e. g. the bearing metal—is to be applied, and subsequently to fill the said mold with molten bearing metal up to any desired level, afterwards allowing both to unite with or without a flux, and/or the application of pressure.

The object of the present invention is to provide an improved process of manufacture of bi-metallic bearing blanks in which the mold is dispensed with, thereby rendering the process both cheaper and more readily performed without complicated machinery.

Another object of the invention is to provide a method of making bearing blanks adapted for their production in large quantities.

Other objects will be apparent from the description which follows and which shows one way of carrying the invention into effect for the purpose of example only.

The invention will be more readily understood from the following description, read in conjunction with the accompanying drawing, whereof:—

Figure 1:
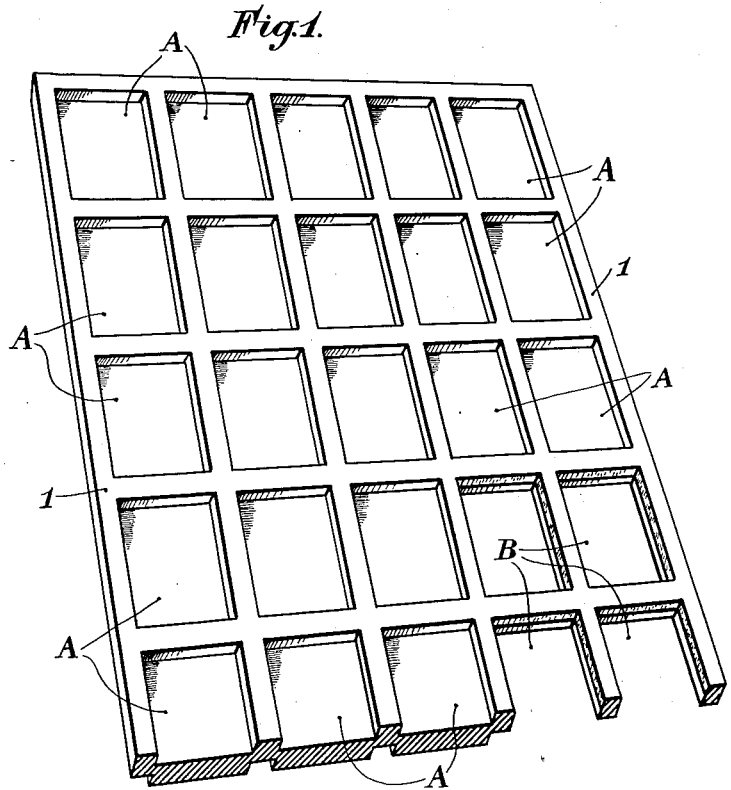
Fig. 1 represents a length of material upon which the process has been partially performed.

Referring to the drawing, a piece of steel or other metal, suitable for forming a backing to bearing blanks, is subjected to an indenting process which forms a series of depressions A in said backing metal in such a manner that the four edges of the depressions are bounded by a raised boundary 1.

Each depression will eventually constitute at least one bearing blank: it is generally preferable to form each blank by a single depression, although in certain cases the depressed portion may constitute several blanks, as will be hereafter described.

The edges of the depressed portion may be partially fractured during formation of the depression and in some cases it is very desirable partly to shear the metal through, along the perimeter of the depression.

The depth of the depression is determined by and equal to the thickness of the bearing metal that is to be applied to the backing metal, and must obviously always be less than the thickness of the backing material, since the latter must not be indented to such an extent that the depressed portion is immediately severed from the remainder of the material.

Preferably a tinning or fluxing operation is then performed upon the backing metal in and around the said depressions A.

Heat is then applied to the backing metal and molten bearing metal is flooded into the depressions to fill them level with the remainder of the backing metal. The material is then passed under a scraper which removes the surplus bearing metal and leaves the upper surface of the material level, the depressions having all been filled up with bearing metal.

Figure 2:
Fig. 2 shows a bearing blank after the process has been performed.

The material is then allowed to cool, after which it is subjected to a severing operation adapted to separate the depressed portions A from the rest of the material 1 (by completing the fracture in cases where such has occurred), and thereby forming a number of flat rectangular blanks 3, as shown in Fig. 2, the upper sides of which are coated with white metal.

In one corner of the material, as shown in Fig. 1, it can be seen that a number of spaces are shown where the process has been carried out and blanks have been removed. This corner illustrates the grid-like structure 1 of the surplus material remaining after the process has been carried out.

As already stated, each depressed portion constitutes a flat blank. In certain cases, the depressed portions, after being severed from the remainder of the material, may themselves be sub-divided into a number of smaller pieces, each of which is capable of being formed into a bearing.

From the foregoing examples, the gist of the invention will be revealed to those skilled in the art, so that they will be enabled, by applying current knowledge, to adapt it to various utilizations, including or retaining one or more of the features that, from the standpoint of prior art, fairly constitute essential characteristics of either the generic or specific aspects of this invention; such adaptations, therefore, should be, and are intended to be, included within the scope of the monopoly claimed.

Having thus described my invention, what I claim and desire to protect by Letters Patent is:—

1. In the manufacture of bi-metal bearing blanks wherein the application of bearing metal to backing metal is performed by flooding the former in a molten state over the latter, the method of defining the area of said blank and the thickness of said bearing metal which comprises punching partially through the plate of backing metal to form a plurality of depressions each approximating to the area of a completed blank and the depth of each depression below the raised boundaries formed by the undisturbed metal of said plate approximating to the thickness of bearing metal required; heating, and applying a flux to, the surface of said backing metal; flooding said depressions with molten bearing metal at least sufficiently to fill them completely level with said boundaries; removing any surplus bearing metal above said boundaries by scraping level therewith and finally severing said depressed portions from said raised boundaries.

2. The process of making a bearing blank by uniting bearing metal to a metal backing plate which comprises stamping the backing plate to move a portion thereof out of the plane of the adjacent undisturbed portion of the plate by an incomplete shearing of the depressed portion, placing the stamped plate in horizontal position with the undisturbed portions thereof uppermost, whereby the depressed portion forms the bottom wall of a mold cavity which has side walls formed by the undisturbed metal of the plate, flooding the mold cavity with molten bearing metal, and completing the shearing of the depressed portion to separate the blank from the plate.

3. The process of forming bi-metal bearing blanks which comprises forming a mold cavity in a metal backing plate by stamping the same to effect a partial shear of a portion thereof from the body of the plate, placing the stamped plate in horizontal position, whereby one of said portions of the plate forms the bottom wall of a mold cavity which has side walls formed by the other portion of the plate, flooding molten bearing metal into the mold cavity, completing the shearing of said portion from the plate after the bearing metal solidifies, and dividing the portion thus separated from the plate into a plurality of blanks.

4. In the manufacture of bi-metal bearing blanks from non-ferrous bearing metal and a backing plate of ferrous metal, the process which comprises stamping spaced portions of the backing plate to depress the said portions by an incomplete shearing of the same from the backing plate, placing the stamped plate in horizontal position, flooding molten bearing metal upon the depressed portions, scraping off surplus molten bearing metal to the level of the unstamped portions of said backing plate, and separating each depressed portion from the body of the plate after the bearing metal solidifies.

JOHN BATE.